United States Patent [19]

Kahn et al.

[11] Patent Number: 5,619,502
[45] Date of Patent: Apr. 8, 1997

[54] STATIC AND DYNAMIC SCHEDULING IN AN ASYNCHRONOUS TRANSFER MODE COMMUNICATION NETWORK

[75] Inventors: Kevin Kahn, Portland, Oreg.; David Eckhardt, Mt. Lebanon, Pa.

[73] Assignee: Intel Corporation, Santa Clara, Calif.

[21] Appl. No.: 307,925

[22] Filed: Sep. 16, 1994

[51] Int. Cl.[6] .................................................. H04L 12/56
[52] U.S. Cl. ........................................... 370/397; 370/412
[58] Field of Search .......................... 370/60, 60.1, 94.1, 370/94.2, 94.3, 85.7, 95.1, 95.3; 395/200.06, 200.2

[56] References Cited

U.S. PATENT DOCUMENTS

| 5,499,238 | 3/1996 | Shon ........................ 370/60.1 |
| 5,515,363 | 3/1996 | Ben-Nun et al. ................ 370/60.1 |
| 5,553,020 | 7/1996 | Byrn et al. ................... 370/60.1 |
| 5,579,302 | 11/1996 | Banks ....................... 370/60.1 |
| 5,579,312 | 11/1996 | Regache ..................... 370/60.1 |

*Primary Examiner*—Hassan Kizou
*Attorney, Agent, or Firm*—Blakely, Sokoloff, Taylor & Zafman

[57] ABSTRACT

A communication subsystem is disclosed including a static scheduler and a dynamic scheduler. The static scheduler accesses a scheduling list that specifies either a virtual circuit or a dynamic scheduling indication for each cell slot on a communication link. The static scheduler selects the virtual circuit specified by the scheduling list if the scheduling list specifies the virtual circuit for the cell slot and the dynamic scheduler selects a virtual circuit from a dynamic scheduling list for transfer of the outbound communication cell if the scheduling list specifies the dynamic scheduling indication for the cell slot. The communication subsystem also includes a counter that counts if an idle communication cell is transferred over the communication link due to an underrun such that the virtual circuit specified by the dynamic scheduling list is skipped if the counter indicates the underrun.

24 Claims, 11 Drawing Sheets

Virtual Register Block

| Next Virtual Request Block Pointer | | 72 |
|---|---|---|
| PDU Length | | |
| Buffer Remain | Buffer Length | |
| Buffer Current Address | | |

*Figure 5*

Virtual Circuit Table Entry

| Dynamic Lists | | 70 |
|---|---|---|
| Control Fields | Virtual Request Block Pointer | |
| Cyclic Redundandy Code | | |
| Virtual Path/Virtual Circuit ID's | | |

STATIC AND DYNAMIC SCHEDULING IN AN ASYNCHRONOUS TRANSFER MODE COMMUNICATION NETWORK

BACKGROUND OF THE INVENTION

1. Field of the Invention

The present invention pertains to the field of digital communications. More particularly, this invention relates to a system and method for static and dynamic scheduling of outbound communication cells in an asynchronous transfer mode communication network.

2. Background

Packet switching communication networks are commonly employed to transfer digital information over long distances. Packet switching networks are also referred to as cell switching communication networks. One such type of network is an asynchronous transfer mode communication network. Such an asynchronous transfer mode communication network enables the transfer of digital voice information, digital video information, and digital data over short or long distances. Such a communication network enables a variety of communication devices to share a common carrier communication link on a demand driven basis.

Typically, a communication path through an asynchronous transfer mode communication network is referred to as a virtual circuit. A typical physical communication link in such a communication network is usually shared among a set of virtual circuits. A typical high speed physical communication link in such a network usually provides sufficient bandwidth to support a large number of virtual circuits. A communication service subscriber in such a system usually contracts with a common carrier service provider to specify the bandwidth utilization of the virtual circuits on the physical communication links provided by the common carrier.

A communication service subscriber on an asynchronous transfer mode communication network typically selects from among a variety of differing data services having differing bandwidth parameters. Such differing data services typically include constant bit rate (CBR) services and variable bit rate (VBR) services. An example application of a constant bit rate data service is a data service that supports a real time audio or video data link. An example application of a variable bit rate data service is a bursty data service for a local area network that provides electronic mail services.

Typically, the communication service subscriber provides a communication controller coupled to one or more of the common carrier physical communication links. Such a communication controller typically schedules outbound communication cells for each virtual circuit and transmits the outbound communication cells over the common carrier communication links.

Such a communication controller typically transmits outbound communication cell traffic according to predefined data rates specified in a data service contract. For example, a communication service subscriber may contract for a maximum data rate and a minimum data rate for variable bit rate virtual circuits. The communication service subscriber typically contracts for fixed data rates on the constant bit rate virtual circuits.

As a consequence, a communication controller for such an asynchronous transfer mode communication network must typically observe a set of bandwidth allocation parameters for each virtual circuit supported by the communication controller. For example, a constant bit rate virtual circuit typically transmits communication cells over the communication network at regular intervals while the virtual circuit is active. In addition, such constant bit rate data services are relatively intolerant of delays in communication cell transmission over the network. On the other hand, variable bit rate virtual circuits typically have a contracted guaranteed minimum data rate and a maximum of burst data rate. A communication controller that supports such data services must schedule outbound traffic to prevent delays in constant bit rate traffic and to observe the contract requirements for variable bit rate traffic while providing maximum bandwidth utilization allowed by the contract.

All communication controllers for such an asynchronous transfer mode communication network subdivide outbound data transmission on a common carrier communication link into a series of cell slots. The duration of each cell slot varies according to the bandwidth of the physical communication link. For example, a physical communication link having a bandwidth of 155 megabits per second is subdivided into cell slots each having a 2.7 microsecond duration.

Typically, a communication controller schedules outbound communication cell traffic by selecting a communication cell for transmission during each cell slot according to the availability of outbound data for each virtual circuit and the bandwidth allocation parameters for each virtual circuit. During each cell slot, a cell scheduler of the communication controller typically selects a virtual circuit from among active virtual circuits that provides data for the next outbound cell slot. Typically, such a cell scheduler interleaves data from each of the active virtual circuits according to the bandwidth allocation parameters. Such a cell scheduler usually allocates cell slots at regular intervals to the constant bit rate virtual circuits. Such a cell scheduler typically allocates the remaining cell slots to the variable bit rate virtual circuits.

Prior communication controllers for such communication networks typically employ dedicated specialized processors to perform cell scheduling and cell assembly functions. Such a dedicated specialized processor is typically required because a high bandwidth common carrier communication link provides minimal cell slot duration. For example, a communication link having a data rate of 155 megabits per second requires that a cell scheduling decision and cell assembly operation be rendered during each cell slot interval of 2.7 microseconds. Unfortunately, such highly specialized dedicated processors greatly increase the cost of such prior communication subsystems.

In addition, prior lower cost communication controllers commonly perform cell scheduling by providing timer circuits for each constant bit rate virtual circuit. Typically in such systems, the timer circuits are preprogrammed with timer values that correspond to the bandwidth of the constant bit rate virtual circuits. Such timer circuits usually count the cell slot intervals on the physical communication link. Typically, an expired timer indicates that the corresponding constant bit rate virtual circuit requires scheduling of an outbound communication cell. Such prior systems usually provide a limited number of timer circuits in order to limit overall system cost. Unfortunately, such a limited number of timer circuits imposes a fixed upper limit to the number of constant bit rate virtual circuits supported in such a prior communication controller.

SUMMARY AND OBJECTS OF THE INVENTION

One object of the present invention is to perform outbound communication cell scheduling for a communication network.

Another object of the present invention is to perform static and dynamic scheduling for an asynchronous transfer mode communication network.

Another object of the present invention is to perform static and dynamic outbound communication cell scheduling for an asynchronous transfer mode communication network wherein virtual circuits are scheduled according to corresponding bandwidth allocation parameters.

A further object of the present invention is to provide a flexible and low cost communication subsystem that schedules static and dynamic outbound communication cells for virtual circuits.

Another object of the present invention is to perform static scheduling by providing a hint vector that avoids time consuming system bus accesses during scheduling of outbound communication cells.

Another object of the present invention is to provide a mechanism for resynchronizing constant bit rate virtual circuits if an underrun condition causes the transfer of an idle communication cell.

These and other objects of the invention are provided by a communication subsystem having a static scheduler that accesses a scheduling list that specifies either a virtual circuit or a dynamic scheduling indication for cell slots on a communication link. The static scheduler selects the virtual circuit specified by the scheduling list for transfer of an outbound communication cell if the scheduling list specifies the virtual circuit for the cell slot and if a hint indication corresponding to the virtual circuit specified by the scheduling list indicates that outbound data is available. The communication subsystem includes a dynamic scheduler that selects a virtual circuit from a dynamic scheduling list for transfer of the outbound communication cell if the scheduling list specifies the dynamic scheduling indication for the cell slot or if the scheduling list specified a static virtual circuit for which the hint indication indicates that no outbound data is available and if a timer corresponding to the virtual circuit specified by the dynamic scheduling list indicates that the dynamic scheduling list is enabled. The communication subsystem also includes a counter that counts if an idle communication cell is transferred over the communication link due to an underrun in an outbound communication cell FIFO buffer. The virtual circuit specified by the dynamic scheduling list is skipped if the counter indicates the underrun.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 4 illustrates the format of a virtual circuit table entry which includes a dynamic lists vector, a virtual register block pointer, and a virtual path/virtual circuit identifier;

FIG. 5 illustrates the format of a virtual register block entry which includes a next virtual request block pointer parameter, a buffer remaining parameter, a buffer length parameter and a buffer current address parameter;

DETAILED DESCRIPTION

Figure 1:
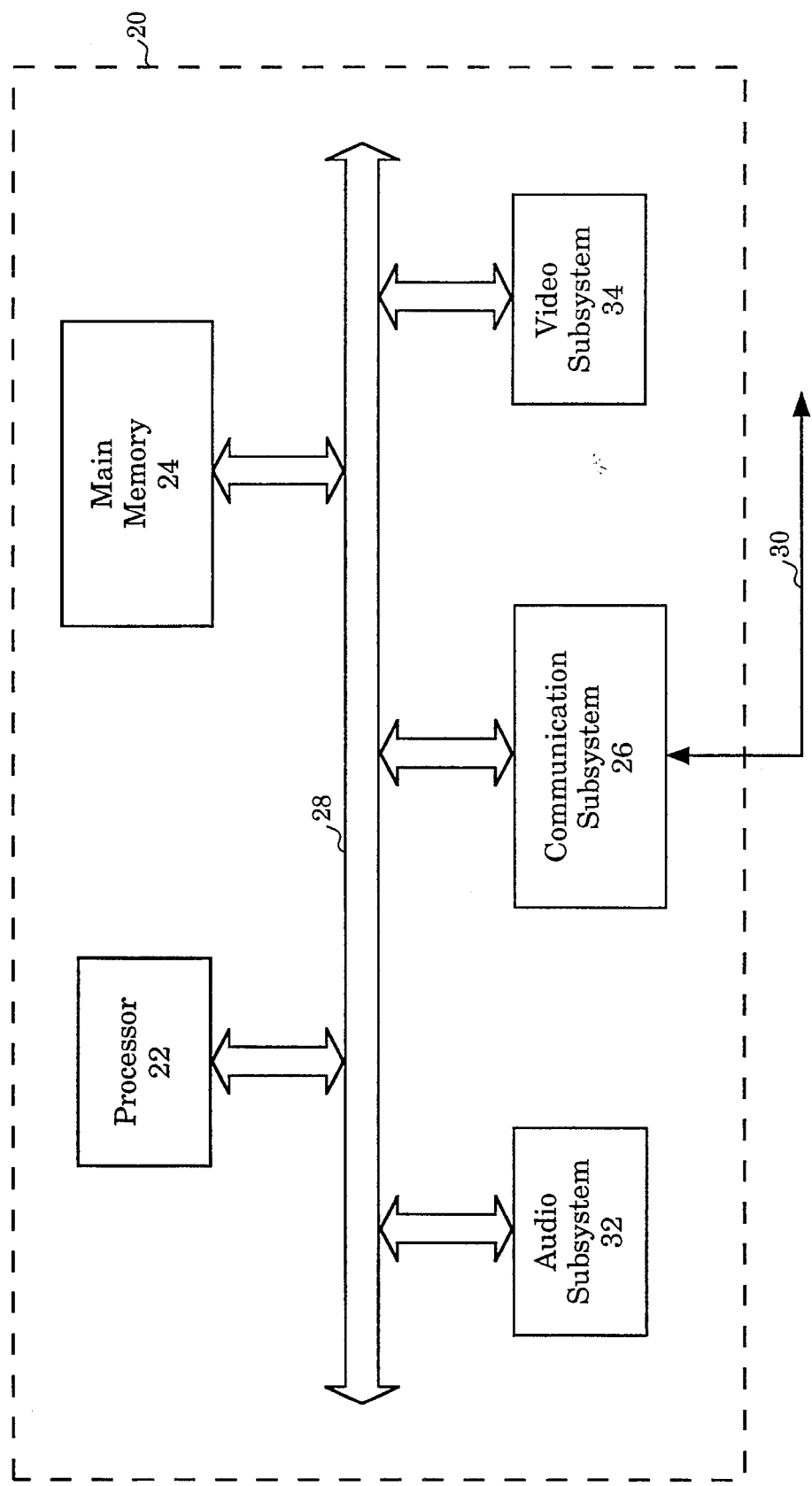
FIG. 1 illustrates a computer system that comprises a processor, a main memory, a communication subsystem, and audio and video subsystems.

FIG. 1 illustrates a computer system 20 for one embodiment. The computer system 20 comprises a processor 22, a main memory 24, and a communication subsystem 26. The processor 22, the main memory 24, and the communication subsystem 26 are each coupled for communication over a system bus 28. The computer system 20 further comprises an audio subsystem 32 and a video subsystem 34.

The communication subsystem 26 enables application programs executing on the computer system 20 to perform packetized digital communication over a communication link 30. For one embodiment, the communication subsystem 26 enables digital communication over the communication link 30 according to an asynchronous transfer mode communication protocol. The communication subsystem 26 enables the transfer of communication cells over the communication link 30. Each communication cell comprises 53 bytes including a 48 byte cell payload and a 5 byte cell header.

The processor 22 executes communication application programs and corresponding device driver programs for managing a set of communication data buffers in the main memory 24. The data buffers in the main memory 24 correspond to virtual circuits created by application programs that share the communication link 30.

The communication software executing on the processor 22 also manages scheduling tables and virtual circuit parameter blocks stored in the communication subsystem 26 that determine the scheduling of outbound communication cells over the communication link 30. The processor 22 initializes the scheduling tables and updates the communication tables and virtual circuit parameter blocks in the communication subsystem 26 as application programs open and close virtual circuits for the communication link 30.

The processor 22 sets up outbound transfer of communication cells by initially writing the outbound data into the appropriate outbound data buffers in the main memory 24. The processor 22 then writes to the virtual circuit parameters in communication subsystem 26 to provide pointers to the outbound data buffers in the main memory 24. The processor 22 also transfers command messages to the communication subsystem 26 to indicate that the corresponding virtual circuit has outbound data available in the outbound data buffers of the main memory 24.

The communication subsystem 26 reads the pointers provided by the virtual circuit parameters to access outbound data from the data buffers of the main memory 24. The communication subsystem 26 schedules a virtual circuit for outbound transmission for each cell slot interval on the communication link 30. After rendering a scheduling decision, the communication subsystem 26 accesses the outbound data from the main memory 24 and assembles the outbound data into an outbound communication cell. Thereafter, the communication subsystem 26 transmits the outbound communication cell over the communication link 30 while scheduling a subsequent cell slot on the communication link 30.

The audio subsystem 32 enables the entry of digital audio information into the computer system 20 via an external microphone (not shown). The audio subsystem also enables playback of digital audio data from the computer system 20 to an external speaker system (not shown). The audio subsystem 32 performs digital to analog conversion and analog to digital conversion to support recording of digitized audio data and rendering of digitized audio to the external speaker system.

The video subsystem 34 enables entry of digital video into the computer system 20 from an external video camera device (not shown). The video subsystem 34 performs analog to digital conversion functions on the received video signal and enables the transfer of digitized video into the main memory 24. The video subsystem also receives digitized video over the system bus 28 and performs digital to analog conversion functions to display the corresponding video scene on an external video monitor (not shown).

Figure 2:
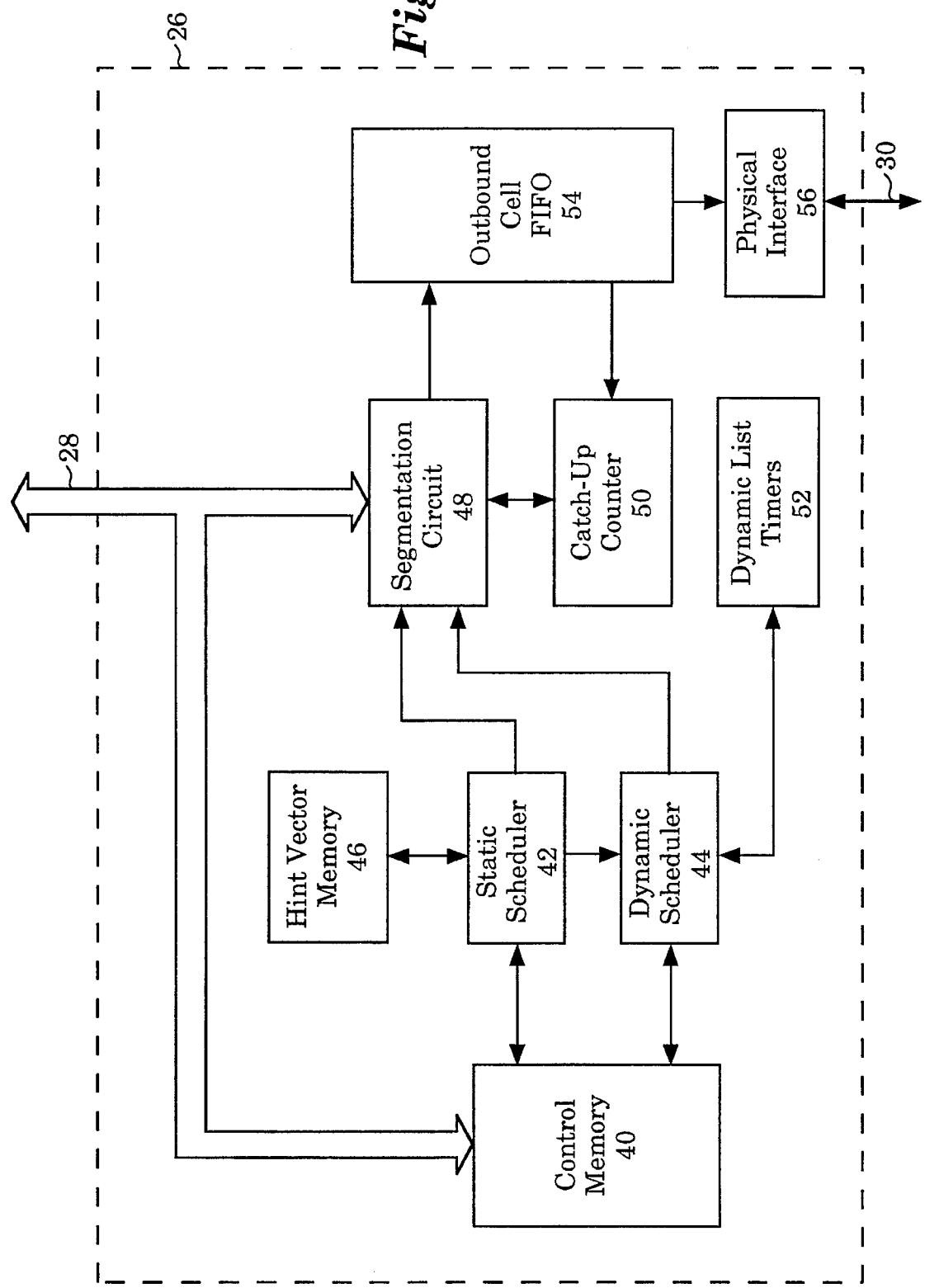
FIG. 2 illustrates the communication subsystem which comprises a control memory, a static scheduler, a dynamic scheduler, a segmentation circuit, an outbound cell first in first out (FIFO) memory, and a physical interface circuit.

FIG. 2 illustrates the communication subsystem 26 for one embodiment. The communication subsystem 26 comprises a control memory 40, a static scheduler 42, and a dynamic scheduler 44. The communication subsystem 26 further comprises a segmentation circuit 48, an outbound cell first in first out (FIFO) memory 54, and a physical interface circuit 56.

The control memory 40 is a high speed local random access memory for the static scheduler 42 and the dynamic scheduler 44. The control memory 40 provides storage areas for a static scheduling table for the static scheduler 42 and a set of dynamic scheduling lists for the dynamic scheduler 44. The control memory 40 also provides storage areas for a virtual circuit table that describes active virtual circuits on the communication link 30 and storage areas for virtual register blocks that provide parameters for outbound data available in the main memory 24.

The static scheduler 42 schedules outbound communication cells for statically scheduled virtual circuits that correspond to constant bit rate traffic on the communication link 30. The static scheduler 42 reads a scheduling sequence from the static scheduling table in the control memory 40. The scheduling sequence specifies either a virtual circuit identifier or a dynamic scheduling indication for each cell slot on the communication link 30. The static scheduler 42 supplies the virtual circuit identifiers to the segmentation circuit 48 for statically scheduled cell slots.

The static scheduler 42 reads hint bits from a hint vector memory 46. The hint bits indicate whether the statically scheduled virtual circuits specified by the scheduling sequence have pending outbound data available in the main memory 24. If pending data is available, then the segmentation circuit 48 reads the appropriate outbound data buffer from the main memory 24 and assembles an outbound communication cell for the statically scheduled virtual circuit into the outbound cell FIFO 54.

If the scheduling sequence from the static scheduling table in the control memory 40 indicates that the next cell slot on the communication link 30 is dynamically scheduled, then the static scheduler 42 requests that the dynamic scheduler 44 schedule the next cell slot. In addition, the static scheduler 42 requests that the dynamic scheduler 44 schedule the next cell slot if the hint bit for a statically scheduled virtual circuit identifier in the scheduling sequence indicates that outbound data is not available in the main memory 24 for the corresponding static virtual circuit.

The dynamic scheduler 44 performs dynamic scheduling for cell slots of the communication link 30 by accessing dynamic scheduling lists from the control memory 40. The dynamic scheduler 44 accesses a set of dynamic list timers 52. The dynamic list timers 52 include a timer circuit corresponding to each dynamic scheduling list in the control memory 40. For one embodiment, the dynamic scheduling lists provide scheduling lists for sixteen differing dynamic schedules and the dynamic list timers 52 contain sixteen corresponding timer circuits.

The dynamic scheduler 44 loads each timer circuit of the dynamic list timers 52 with predetermined values according to the bandwidth granularity required for scheduling the communication link 30. Each of the timer circuits in the dynamic list timers 52 count cell slots on the communication link 30. Each dynamic scheduling list in the control memory 40 is enabled if the corresponding timer circuit in the dynamic list timers 52 is expired. The dynamic scheduler 44 prioritizes the enabled dynamic scheduling lists to select a virtual circuit for service during a next cell slot over the communication link 30.

The dynamic scheduler 44 reads a virtual circuit identifier and a corresponding burst count from the selected dynamic scheduling list in the control memory 40. The dynamic scheduler 44 supplies the virtual circuit identifier to the segmentation circuit 48 for a dynamically scheduled cell slot. The dynamic scheduler 44 then updates the dynamic scheduling list in the control memory 40 while the segmentation circuit 48 reads the appropriate outbound data buffer from the main memory 24 and assembles an outbound communication cell for the dynamically scheduled virtual circuit into the outbound cell FIFO 54.

The physical interface circuit 56 accesses outbound communication cells from the outbound cell FIFO 54. The physical interface circuit 56 transfers the outbound communication cells over the communication link 30.

Access latencies on the system bus 28 may generate underrun conditions by the segmentation circuit 48 to the outbound cell FIFO 54. If the outbound cell FIFO 54 empties before the segmentation circuit 48 assembles another outbound communication cell then the outbound cell FIFO 54 generates an idle communication cell to the physical interface circuit 56. A catch up counter 50 increments each time the outbound cell FIFO 54 generates an idle outbound communication cell to the physical interface circuit 56. The catch up count in the catch up counter 50 is used by the dynamic scheduler 44 to skip dynamic scheduled cell slots and prevent an accumulation of communication latency for the constant bit rate virtual circuits on the communication cell 30.

Figure 3:
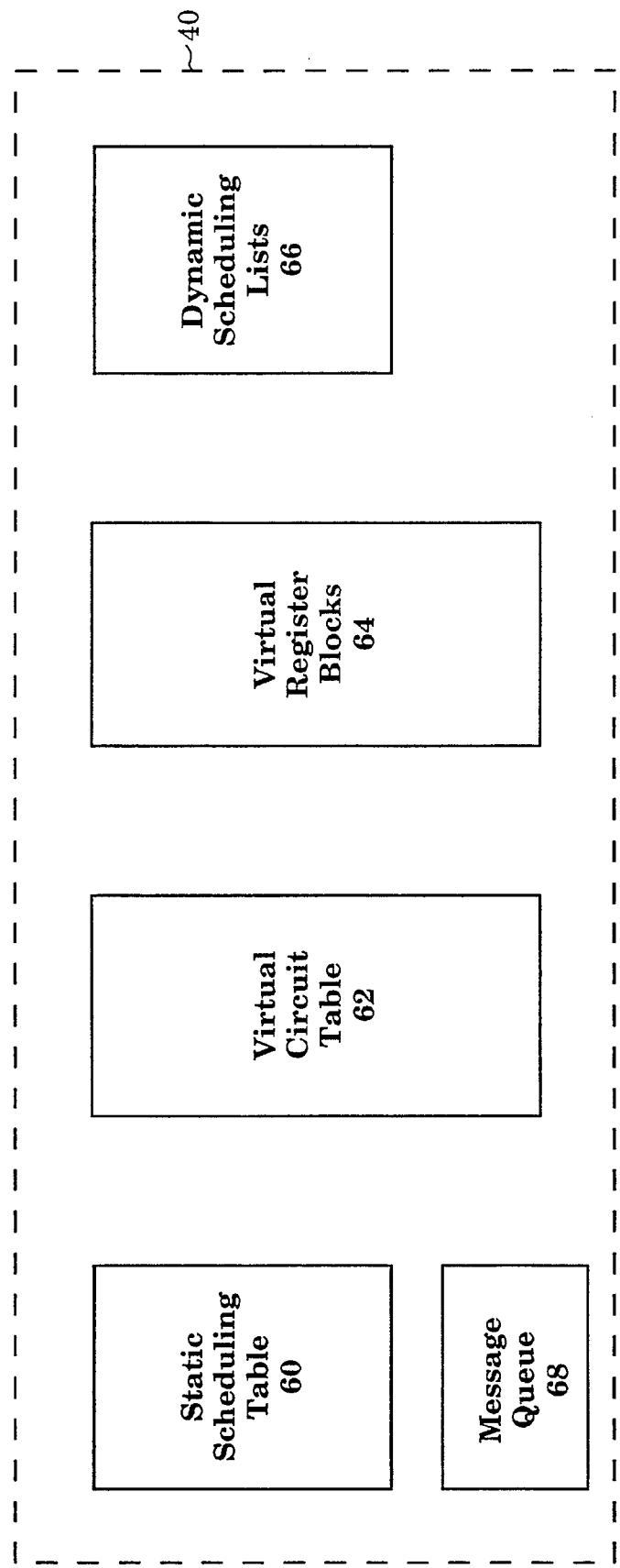
FIG. 3 illustrates the data structures maintained in the control memory including a static scheduling table, a virtual circuit table, a set of virtual register blocks, a set of dynamic scheduling lists, and a message queue.

FIG. 3 illustrates the data structures maintained in the control memory 40 for one embodiment. The control memory 40 provides storage areas for a static scheduling table 60, a virtual circuit table 62, a set of virtual register blocks 64, and a set of dynamic scheduling lists 66. The control memory 40 also provides a storage area for a message queue 68.

The static scheduling table 60 stores a scheduling sequence that maps the active virtual circuits on the communication link 30 to cell slots over the communication link 30. The static scheduling table 60 is initialized by the processor 22 and updated as virtual circuits are opened and closed by application programs executing on the processor 22. The static scheduler 42 accesses each entry in the static scheduling table 60 in sequence to determine whether the corresponding cell slot is allocated to a statically scheduled virtual circuit or to a dynamic scheduled virtual circuit.

The virtual circuit table 62 contains an entry for each virtual circuit on the communication link 30. The processor 22 writes to entries in the virtual circuit table 62 to set up outbound transmission parameters for the corresponding virtual circuits. The outbound parameters include a list specification, a burst control fields value, pointers to the virtual register blocks, and temporary storage for the segmentation circuit 48 to use while transmitting sequences of cells (CRC).

The virtual register blocks 64 describes regions of main memory 24 which contain the data to be sent on a virtual circuit on the communication link 30. The virtual register block entries of the virtual register blocks 64 are arranged in a linked list structure by the processor 22. The virtual register blocks 64 provide outbound data buffer address and linked list information that enables the segmentation circuit 48 to access outbound data from the main memory 24 and assemble outbound communication cells into the outbound cell FIFO 54.

The dynamic scheduling lists 66 provide storage areas for a set of dynamic scheduling lists maintained by the dynamic scheduler 44. The dynamic scheduling lists 66 are initialized by the processor 22 as virtual circuits on the communication link 30 are opened by communication software of the computer system 20. The processor 22 writes to the appropriate areas of the dynamic scheduling lists 66 as outbound data for the virtual circuits is assembled into the main memory 24.

For one embodiment, the dynamic scheduling lists 66 comprise a set of sixteen dynamic scheduling lists. The dynamic scheduler 44 reads the dynamic scheduling lists 66 according to a priority scheme for the dynamic scheduling lists and an enable/disable state of each dynamic scheduling list as indicated by the dynamic list timers 52.

The message queue 68 provides a storage area for messages transferred between the processor 22 to the communication subsystem 26. The messages in the message queue 68 from the processor 22 include messages that specify the addition of virtual circuits to the dynamic scheduling lists 66 and that specify the modification of the hint bits in the hint vector memory 46.

FIG. 4 illustrates the format of a virtual circuit table entry 70 of the virtual circuit table 62 for one embodiment. The virtual circuit table 62 contains a virtual circuit table entry such as the virtual circuit table entry 70 that corresponds to each active virtual circuit on the communication link 30. The parameters contained in the virtual circuit table entry 70 include a dynamic lists vector, a virtual request block pointer, and a virtual path/virtual circuit identifier.

Dynamic lists vector parameter of the virtual circuit table entry 70 specifies which dynamic scheduling lists for the corresponding virtual circuit is currently on. The virtual request block pointer parameter specifies a virtual register block entry in the virtual register blocks 64 for outbound data corresponding to the virtual circuit. The virtual path/virtual circuit identifier parameters of the virtual circuit table entry 70 provides the virtual path and circuit identifiers for the corresponding virtual circuit according to an asynchronous transfer mode communication protocol.

FIG. 5 illustrates the format of a virtual register block entry 72 of the virtual register blocks 64 for one embodiment. The virtual register blocks 64 include a set of virtual register block entries such as the virtual register block 72 that provide parameters for outbound data available in the main memory 24 for the corresponding virtual circuits on the communication link 30. The parameters of the virtual register block entry 72 include a next virtual request block pointer parameter, a buffer remain parameter, a buffer length parameter and a buffer current address parameter.

The virtual register blocks entry 72 for an outbound data buffer in the main memory 24 is chained to another virtual register block for the outbound data buffer via the next virtual request block pointer parameter. The buffer current address and buffer length parameters of the virtual register block 72 provide access information that enables the segmentation circuit 48 to access outbound data from the main memory 24. The buffer remain parameter of the virtual register block 72 indicates the amount of data remaining in the corresponding outbound data buffer in the main memory 24 as the segmentation circuit 48 assembles the outbound data into outbound communication cells in the outbound cell FIFO 54.

Figure 6:
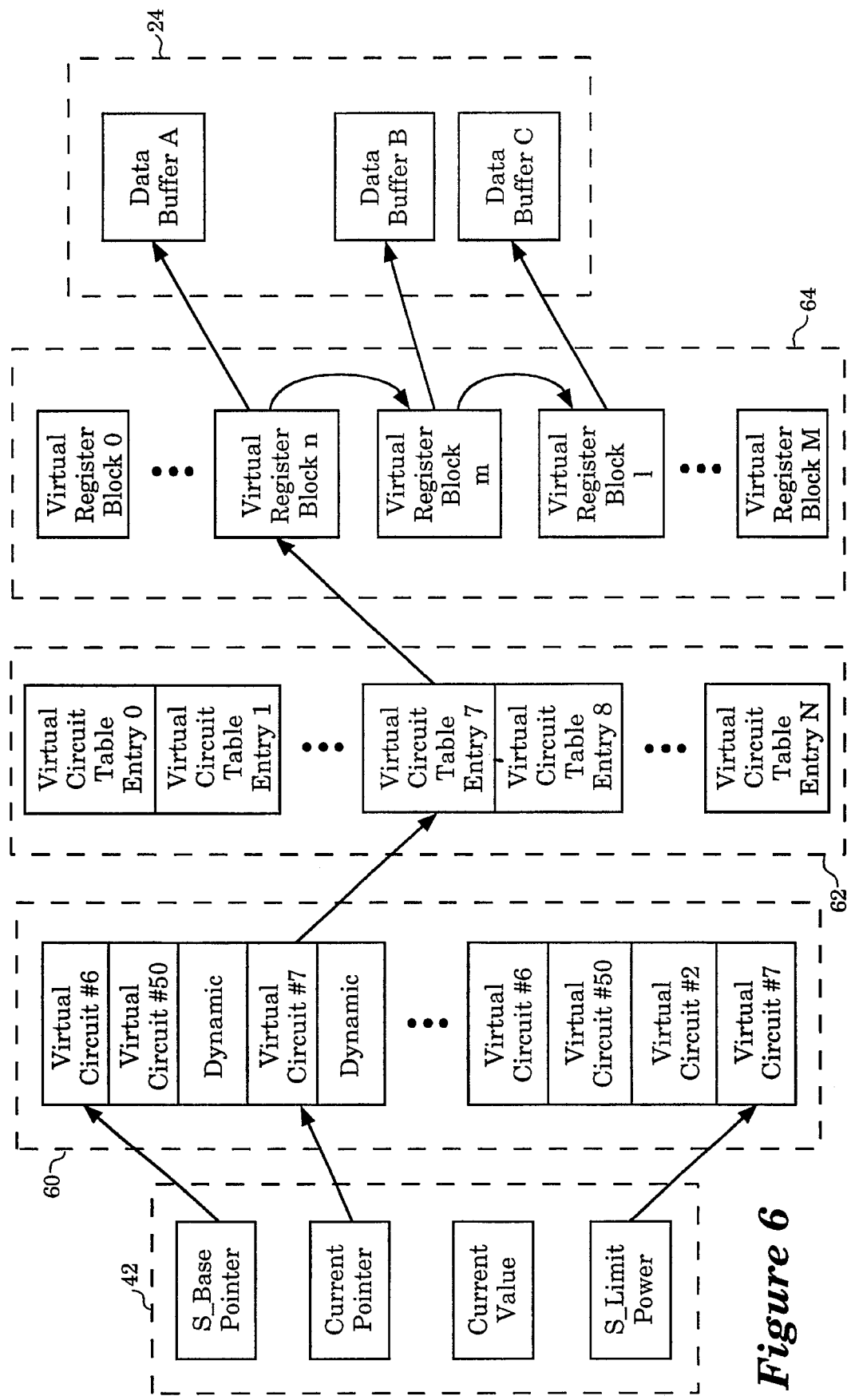
FIG. 6 illustrates a static scheduling operation by the static scheduler for one embodiment.

FIG. 6 illustrates a static scheduling operation by the static scheduler 42 for one embodiment. The static scheduler 42 contains a static base pointer register (S_BASE POINTER) that points to the first entry in the static scheduling table 60. The static scheduler 42 contains a current pointer register that points to the current entry in the static scheduling table 60 as the current entry is scheduled. The static scheduler 42 contains a current value register that stores either a virtual circuit identifier or a dynamic scheduling indication from the current entry of the static scheduling table 60.

The current value is a virtual circuit identifier if the corresponding entry in the static scheduling table 60 is a statically scheduled virtual circuit. Otherwise, the current value in the current value register is the dynamic scheduling indication. The dynamic scheduling indication indicates that the cell slot for the corresponding entry in the static scheduling table 60 is dynamically scheduled by the dynamic scheduler 44.

The static scheduler 42 contains a static limit pointer register (S_LIMIT POINTER) that indicates the end of the static scheduling table 60. The processor 22 preprograms the static base pointer and the static limit pointer registers in the static scheduler 42 according to the virtual circuit configuration of the communication link 30. The static scheduler 42 updates the current pointer register and the current value register while stepping through the static scheduling table 60 for each cell slot over the communication link 30. When the current pointer register equals the static limit pointer it is next reset to the static base pointer.

During each cell slot on the communication link 30, the static scheduler 42 reads the entry of the static scheduling table 60 specified by the current pointer register. In the example shown, the static scheduler 42 reads virtual circuit identifier #7 from the current entry of the static scheduling table 60. The virtual circuit identifier #7 from the current entry of the static scheduling table 60 indicates that virtual circuit #7 is statically scheduled for the next cell slot over the communication link 30. Accordingly, the static scheduler 42 reads the virtual circuit table entry 7 of the virtual circuit table 62 to obtain parameters for outbound data for virtual circuit #7.

The virtual request block pointer parameter of the virtual circuit table entry 7 points to virtual register block n of the virtual register blocks 64. The buffer current address, buffer length, and buffer remain parameters of the virtual register block n point to the data buffer A in the main memory 24 that contains outbound data for virtual circuit #7.

The next virtual request block pointer parameter of the virtual register block n points to the virtual register block m as the next virtual register block in the virtual register block chain for the virtual circuit #7. The buffer current address, the buffer length and the buffer remain parameters of the virtual register block m point to the data buffer B in the main memory 24 as the next data buffer that contains outbound data for the virtual circuit #7.

The next virtual register block pointer of the virtual register block m points to the virtual register block 1. The buffer current address, the buffer length, and the buffer remain parameters of the virtual register block 1 point to the data buffer C in the main memory 24 to complete the example list of outbound data buffers corresponding to the virtual circuit #7. The segmentation circuit 48 reads outbound data from the data buffers A–C in the main memory 24 and assembles the outbound data into outbound communication cells in the outbound cell FIFO 54 as each cell slot is scheduled for the virtual circuit #7. If the data buffer C is the last data buffer prepared for the virtual circuit #7, then the next virtual register block is processed.

Figure 7:
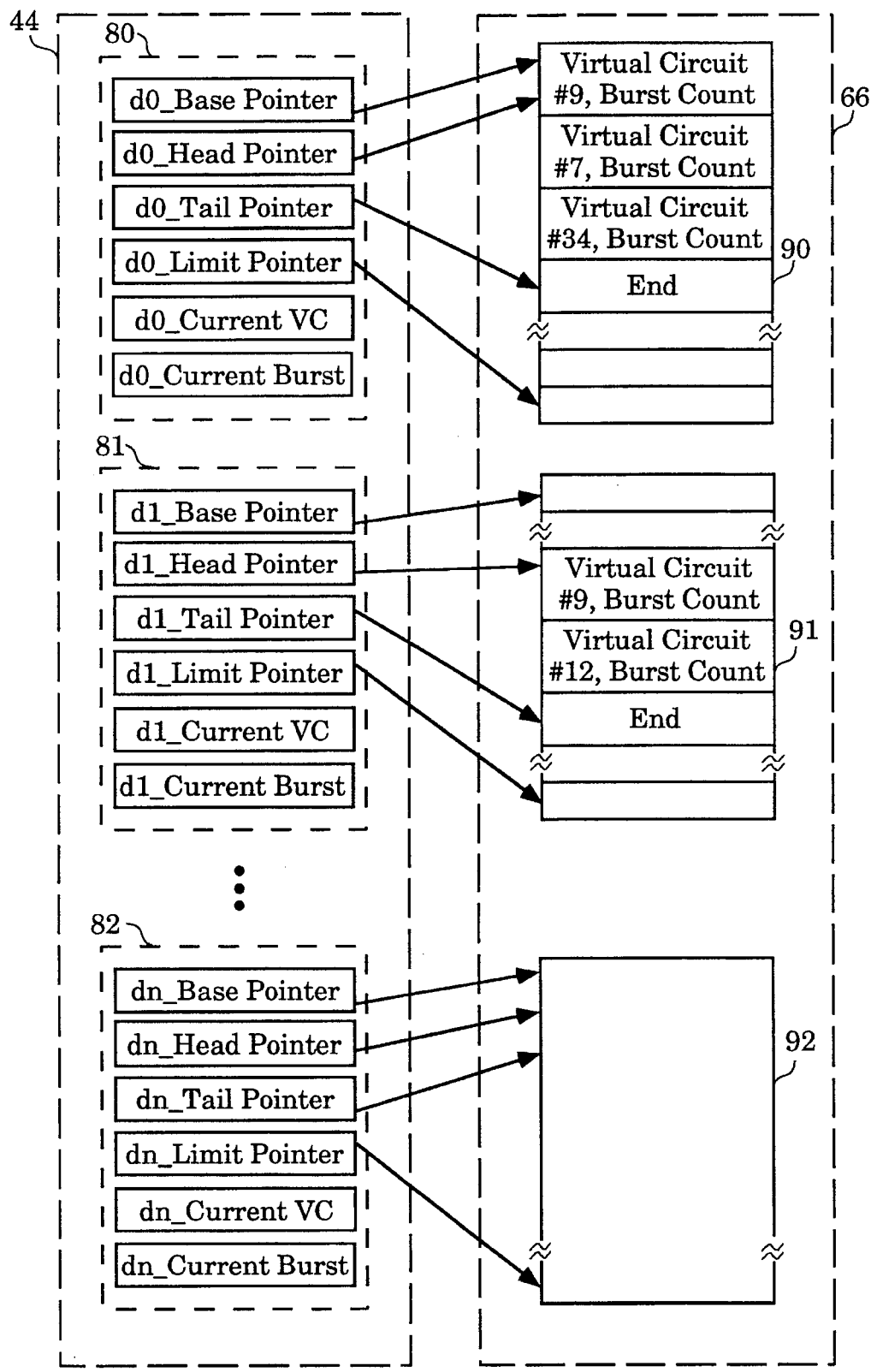
FIG. 7 illustrates dynamic scheduling operations by the dynamic scheduler for one embodiment.

FIG. 7 illustrates dynamic scheduling operations by the dynamic scheduler 44 for one embodiment. The dynamic scheduler 44 performs a dynamic scheduling operation if the static scheduler 42 indicates that the current entry in the static scheduling table 60 specifies a dynamic scheduling cell slot or if a statically scheduled virtual circuit has no outbound data available.

The dynamic scheduler 44 contains a current VC register and current burst register and multiple dynamic scheduling register sets 80–82. Each of the dynamic scheduling register sets 80–82 corresponds to a dynamic scheduling list entry of the dynamic scheduling lists 66. The dynamic scheduling register set 80 corresponds to a dynamic scheduling list 90. Similarly, the dynamic scheduling register set 82 corresponds to a dynamic scheduling list 91 and the dynamic scheduling register set 82 correspond to a dynamic scheduling list 92. The current VC register holds the VC number of the VC that has been dynamically scheduled. The current burst holds the number of cells from that VC that will be sent before a new dynamic VC is selected.

Each of the dynamic scheduling register sets 80–82 comprises a base pointer register, a head pointer register, a tail pointer register, and a limit pointer register. Base pointer register points to the first entry in the corresponding dynamic scheduling list. The head pointer together with the tail pointer specifies the active entries of the corresponding dynamic scheduling list. The limit pointer specifies the length of the corresponding dynamic scheduling list. For example, the d0_base pointer of the dynamic registers 80 specifies the first entry of the dynamic scheduling list 90, the d0_head pointer and the d0_tail pointer specify active entries in the dynamic scheduling list 90 and the d0_limit pointer specifies the length of the dynamic scheduling list 90.

The processor 22 preprograms the base pointer and the limit pointer of each of the dynamic scheduling register sets 80–82 according to the communication configuration for the communication link 30. The dynamic scheduler 44 maintains the head and tail pointers of each of the dynamic scheduling register sets 80–82 as virtual circuits are dynamically scheduled and serviced. The dynamic scheduler 44 also maintains the current VC and current burst registers.

The entries in the dynamic scheduling lists 90–92 specified by the corresponding head pointer registers contain virtual circuit identifiers and burst counts for the corresponding dynamically scheduled virtual circuits. A virtual circuit identifier and corresponding burst count from the dynamic scheduling lists 90–92 is transferred to the segmentation circuit 48 by the dynamic scheduler 44 for each dynamically scheduled cell slot on the communication link 30. The segmentation circuit 48 uses the received virtual circuit identifier to access the virtual circuit table 62. The accessed entry of the virtual circuit table 62 in turn points to the virtual register blocks 64 to provide parameters for outbound data from the outbound buffers in the main memory 24 as illustrated above for the static scheduling example.

For the example shown, the dynamic scheduling list 90 comprises virtual circuit #9, virtual circuit #7, and virtual circuit #34, each with a corresponding burst count. The end marker in the dynamic scheduling list 90 indicates the current end of the dynamic scheduling list. In addition, the dynamic scheduling list 91 contains a schedule comprising virtual circuit #9 and virtual circuit #12 with burst counts followed by an end marker.

Figure 8:
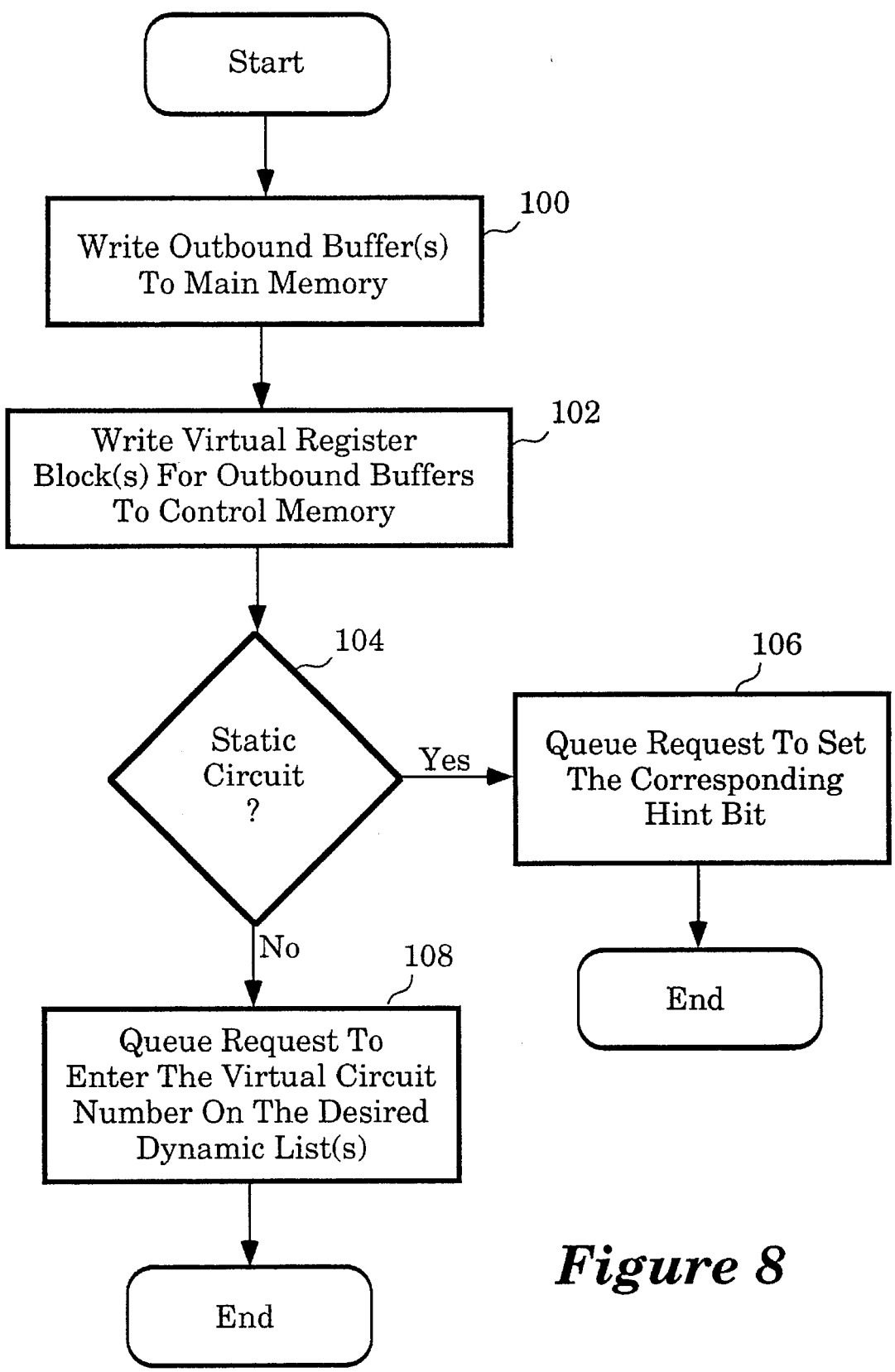
FIG. 8 is a flow diagram that illustrates the posting of outbound data in the main memory by communication programs executing on the computer system.

FIG. 8 is a flow diagram that illustrates the posting of outbound data in the main memory 24 by the processor 22. At block 100, the processor 22 writes the outbound data into outbound data buffers in the main memory 24 over the system bus 28. Thereafter at block 102, the processor 22 writes the outbound data parameters into virtual register block entries of the virtual register blocks 62 in the control memory 40. The outbound data parameters in virtual register blocks 64 provide pointers to the outbound data posted in the outbound data buffers in the main memory 24.

At decision block 104, if the newly posted data in the main memory 24 corresponds to a statically scheduled virtual circuit such as a constant bit rate virtual circuit, then control proceeds to block 106. At block 106, the processor 22 transfers a message into the message queue 68 of the control memory 40 to set the hint bit for the corresponding statically scheduled virtual circuit in the hint vector memory 46. The hint bit for the corresponding static virtual circuit indicates to the static scheduler 42 that outbound data for the static virtual circuit is available in the main memory 24.

If a static virtual circuit is not indicated at decision block 104, then control proceeds to block 108. At block 108, the processor transfers a message into the message queue 68 of the control memory 40 to request entry of the virtual circuit identifier and corresponding burst count for the dynamically scheduled virtual circuit onto the specified dynamic scheduling list entry of the dynamic scheduling lists 66. The entry of the virtual circuit identifier on a dynamic scheduling list causes the scheduling of outbound cells for the newly posted outbound data in the main memory 24 by the dynamic scheduler 44 according to the dynamic list timers 52.

Figure 9:
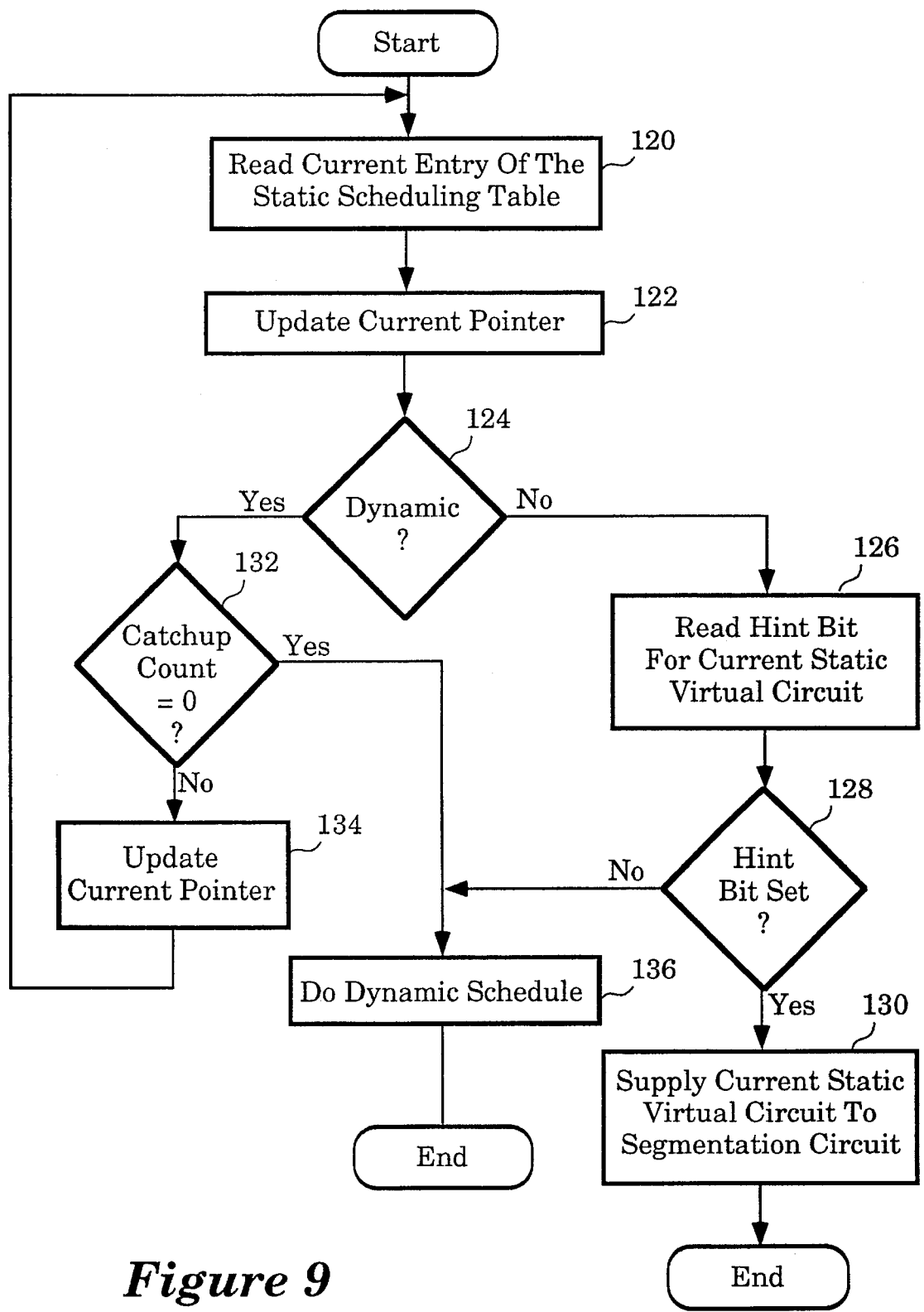
FIG. 9 is a flow diagram that illustrates a static scheduling operation by the static scheduler for one embodiment.

FIG. 9 is a flow diagram that illustrates a static scheduling operation by the static scheduler 42 for one embodiment. At block 120, the static scheduler 42 reads the current entry of the static scheduling table 60. The current entry of the static scheduling table 60 is specified by the current pointer register in the static scheduler 42. At block 122 the static scheduler 42 updates the current pointer register. The static scheduler 42 stores the value read from the static scheduling table 60 into the current value register.

At decision block 124, the static scheduler 42 determines whether the current value in the current value register specifies a dynamically scheduled cell slot. If the current value register does not specify a dynamically scheduled cell slot at decision block 124 then control proceeds to block 126 to statically schedule the virtual circuit specified in the current value register.

At block 126, the static scheduler 42 reads the hint bit that corresponds to the virtual circuit specified in the current value register from the hint vector memory 46. At decision block 128, if the hint bit corresponding to the statically scheduled virtual circuit is set then control proceeds to block 130. At block 130, the static scheduler 42 supplies the virtual circuit identifier specified in the current value register to the segmentation circuit 48. The segmentation circuit 48 uses the virtual circuit identifier to index the virtual circuit table 62 which specifies entries in the virtual register blocks 64. The segmentation circuit 48 reads the specified outbound data buffers of the main memory 24 and assembles an outbound communication cell into the outbound cell FIFO 54.

If the hint bit corresponding to the statically scheduled virtual circuit is not set at decision block 128, then control proceeds to block 136 to request a dynamically scheduling operation by the dynamic scheduler 44. The cleared hint bit for the statically scheduled virtual circuit indicates that no outbound data is available in the main memory 24 for the statically scheduled virtual circuit.

At decision block 124, if the current value register specifies a dynamically scheduled cell slot then control proceeds to decision block 132. At decision block 132, the static scheduler 42 determines whether the catch up count stored in the catch up counter 50 is 0. If the catch up count is 0 at decision block 132, then control proceeds to block 136 to request a dynamically scheduling operation by the dynamic scheduler 44. If the catch up count is not 0 at decision block 132 then control proceeds to block 134. At block 134, the static scheduler 42 updates the current pointer register to skip over the current dynamically scheduled cell slot entry in the static scheduling table 60. The catch up counter 50 is decremented by 1 for the recovered cell slot interval and then control then proceeds back to block 120 to read the next entry of the static scheduling table 60.

Figure 10:
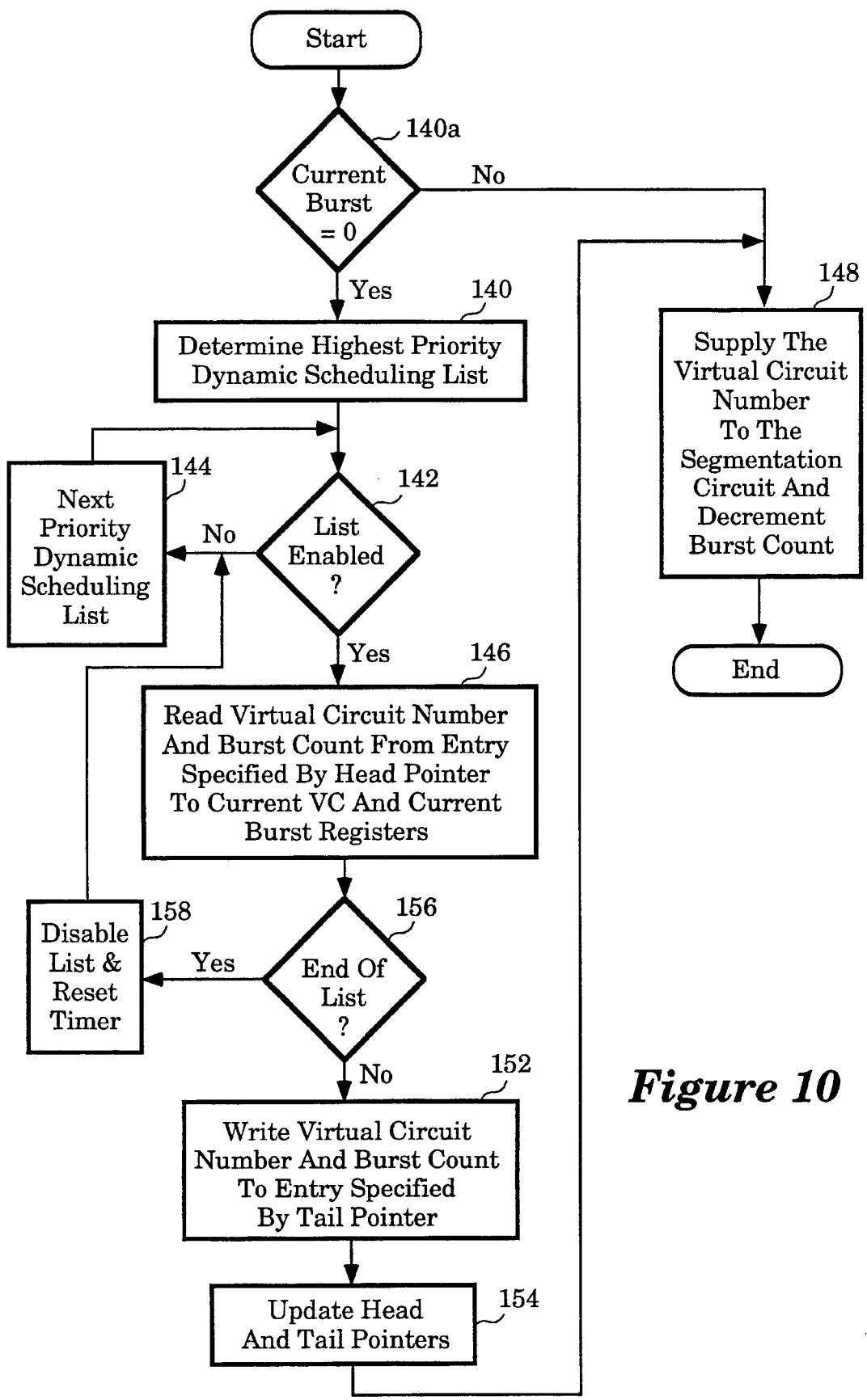
FIG. 10 is a flow diagram that illustrates a dynamic scheduling operation by the dynamic scheduler for one embodiment.

FIG. 10 illustrates a dynamic scheduling operation by the dynamic scheduler 44 for one embodiment. At block 140*a* the dynamic scheduler determines whether it has a burst in progress for some VC. If it does it proceeds to 148 to send the next cell of the burst. If it does not it proceeds to block 140 to select a new VC and burst.

At block 148, the dynamic scheduler 44 transfers the current virtual circuit identifier to the segmentation circuit 48. The dynamic scheduler 44 also decrements the current burst count. At block 140, the dynamic scheduler 44 determines the highest priority dynamic scheduling list from among the dynamic scheduling lists 90–92.

At decision block 142, the dynamic scheduler 44 determines whether the dynamic scheduling list selected at block 140 is enabled. A dynamic scheduling list is enabled when the corresponding timer of the dynamic list timers 52 is expired. If the selected dynamic scheduling list is not enabled at decision block 142, then control proceeds to block 144 to determine the next priority dynamic scheduling list from the dynamic scheduling lists 90–92.

If the selected dynamic scheduling is enabled at decision block 142, then control proceeds to block 146. At block 146, the dynamic scheduler 44 reads the virtual circuit identifier and burst count from an entry of the selected dynamic scheduling list specified by the head pointer of the dynamic scheduling registers for the selected dynamic scheduling list. If the value read is the end of list marker at decision block 156 then the dynamic scheduler 44 at block 158 disables the list, resets the timer, writes the end marker to the tail of the list and updates the tail pointer. Control then proceeds to block 144 to select another list. If the value read is not the end of list marker at decision block 156, the dynamic scheduler 44 uses the values read to set the current VC and current burst registers, and writes the values to the entry specified by the tail pointer for this dynamic list at block 152.

Thereafter at block 154 the dynamic scheduler 44 updates the head and tail pointers of the dynamic scheduler registers corresponding to the selected dynamic scheduling list. Control then proceeds to block 148 to send the next cell from the selected virtual circuit.

Figure 11:
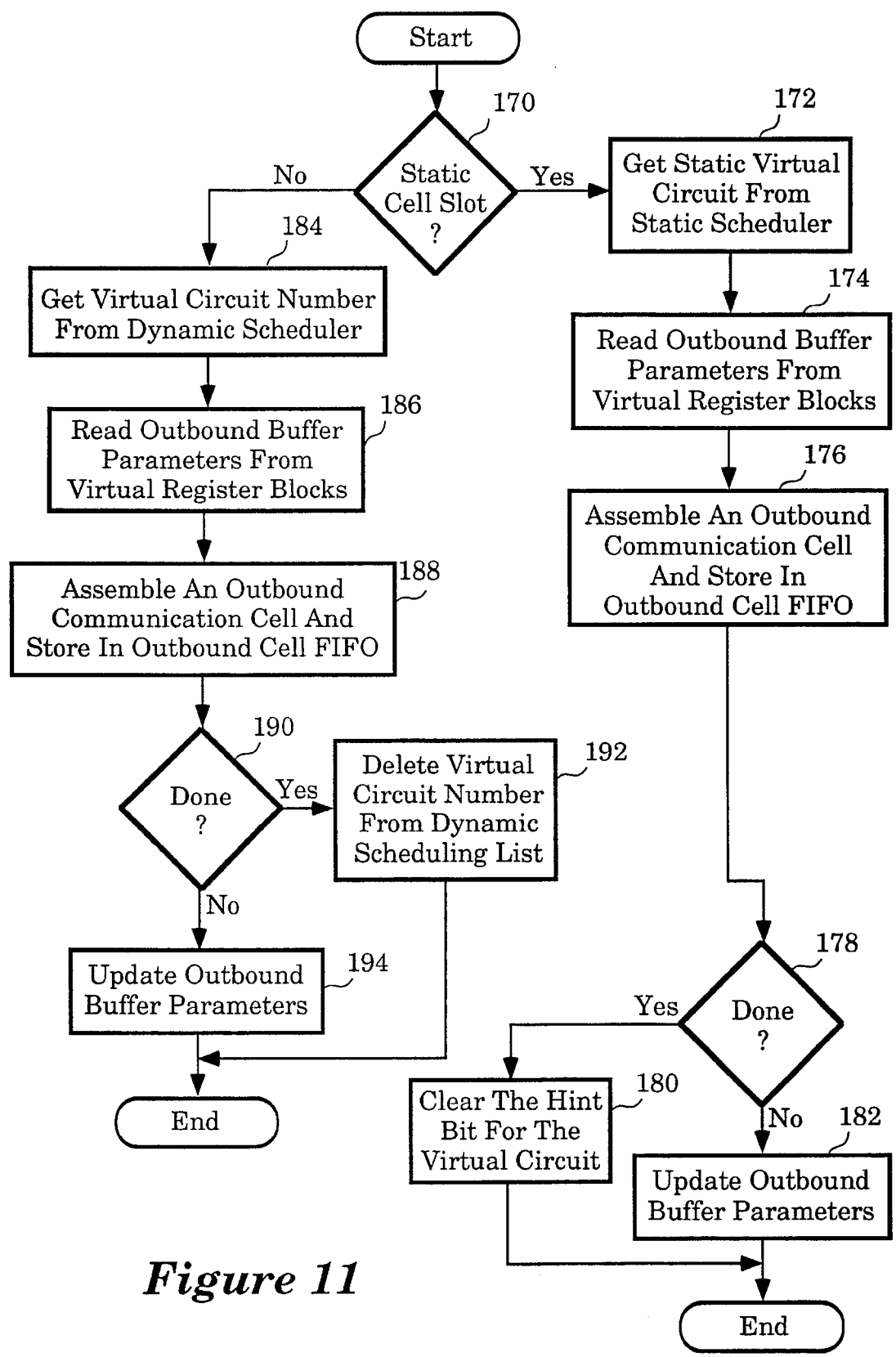
FIG. 11 is a flow diagram that illustrates the assembly of an outbound communication cell into the outbound cell FIFO by the segmentation circuit for one embodiment.

FIG. 11 is a flow diagram that illustrates the assembly of an outbound communication cell into the outbound cell FIFO 54 by the segmentation circuit 48 for one embodiment. At decision block 170, the segmentation circuit 48 determines whether the current cell slot is statically scheduled by the static scheduler 42 or dynamically scheduled by the dynamic scheduler 44 according to the current entry in the static scheduling table 60. If the cell slot is statically scheduled at decision block 170 then control proceeds to block 172. Otherwise control proceeds to block 184.

At block 172, the segmentation circuit 48 obtains the statically scheduled virtual circuit identifier from the static scheduler 42. Thereafter at block 174, the segmentation circuit 48 reads the outbound buffer parameters for the statically scheduled virtual circuit from the virtual register blocks 64 as indicated by pointer parameters from the virtual circuit table entry in the virtual circuit table 62 that corresponds to the statically scheduled virtual circuit.

At block 176, the segmentation circuit 48 uses the pointer parameters from the virtual register blocks 64 to read outbound data from outbound data buffers in the main memory 24 and assemble an outbound communication cell into the outbound cell FIFO 54. The segmentation circuit 48 assembles the header of the outbound communication cell using virtual path/virtual circuit identifiers from the virtual circuit table entry corresponding to the statically scheduled virtual circuit.

At decision block 178, the segmentation circuit 48 determines whether the outbound data buffer chain specified by the virtual register blocks 64 for the statically scheduled virtual circuit have been emptied. If the outbound data buffer chain for the statically scheduled virtual circuit has been emptied at decision block 178 then control proceeds to block 180. At block 180, the segmentation circuit 48 clears the hint bit that corresponds to the statically scheduled virtual circuit in the hint vector memory 46. The segmentation circuit 48 clears the hint bit to indicate that the statically scheduled virtual circuit does not have pending outbound data in the main memory 24.

If the outbound data buffer chain has not been emptied at decision block 178 then control proceeds to block 182. At block 182, the segmentation circuit 48 updates the outbound buffer parameters in the virtual register block 64 for the statically scheduled virtual circuit. The segmentation circuit 48 updates the buffer remain, the buffer length, and the buffer current address parameters of the virtual register blocks in the virtual register blocks 64. The updated parameters in the virtual register blocks 64 provide updated parameters for the next scheduled outbound cell for the statically scheduled virtual circuit.

At block 184, the segmentation circuit 48 handles a dynamically scheduled cell slot by obtaining the virtual circuit identifier for the dynamically scheduled cell slot from the dynamic scheduler 44. Thereafter, at block 186 the segmentation circuit 48 reads the outbound buffer parameters for the dynamically scheduled virtual circuit from the virtual register blocks 64. At block 188, the segmentation circuit 48 accesses the outbound data buffers for the dynamically scheduled virtual circuit from the main memory 24 and assembles an outbound cell into the outbound cell FIFO 54.

At decision block 190, the segmentation circuit 48 determines whether the outbound data buffers corresponding to the dynamically scheduled virtual circuit have been emptied from the main memory 24. If the outbound data buffers have been emptied at decision block 190 then control proceeds to block 192. At block 192, the segmentation circuit 48 deletes the virtual circuit identifier for the dynamically scheduled virtual circuit from the dynamic scheduling lists 66. Otherwise, at block 194 the segmentation circuit 48 updates the outbound buffer pointer parameters in the virtual register blocks 64 that correspond to the dynamically scheduled virtual circuit.

Figure 12:
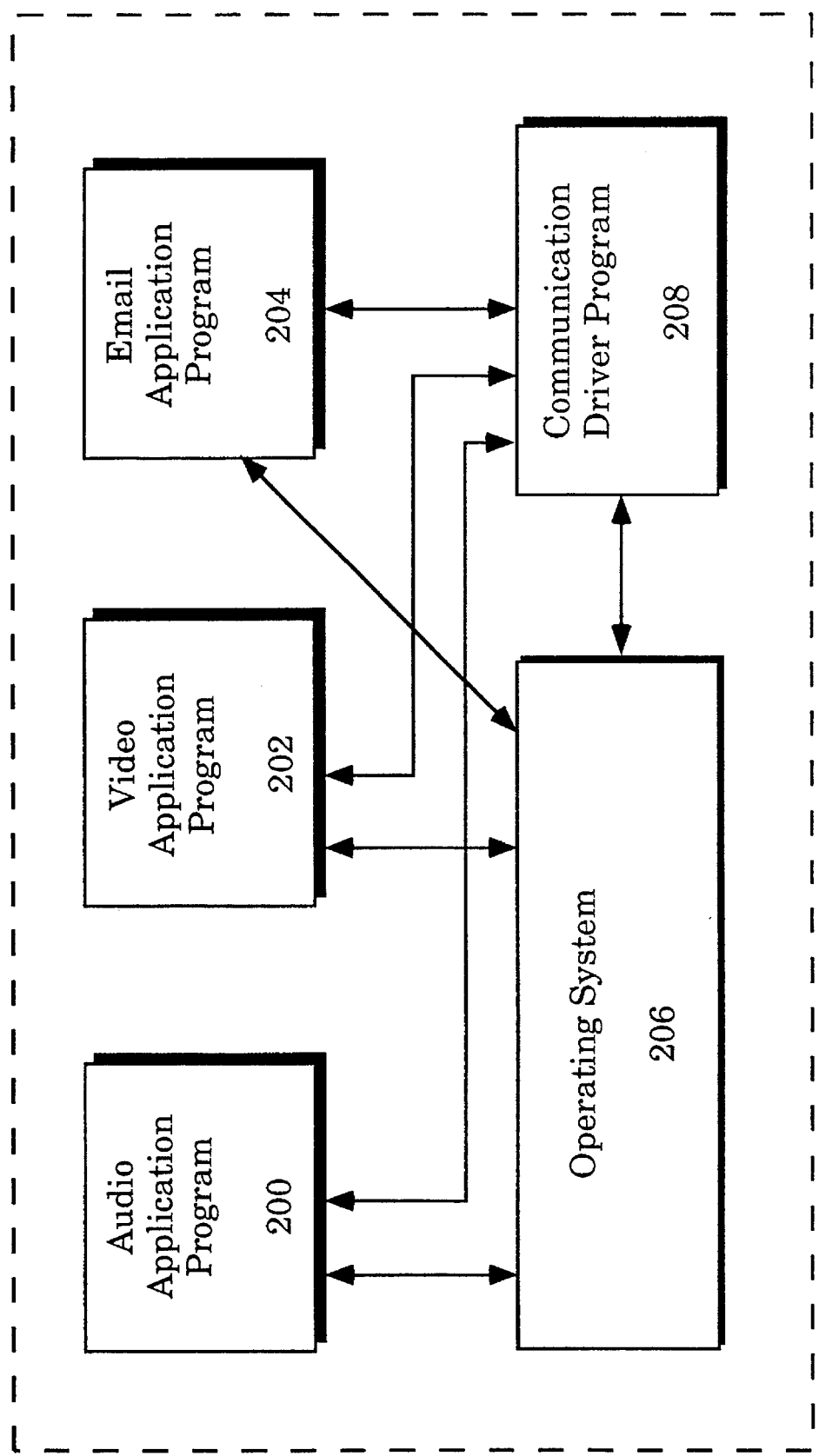
FIG. 12 illustrates the software architecture of the computer system including an audio application program, a video application program, an electronic mail application program, an operating system and a communication driver program.

FIG. 12 illustrates the software architecture of the computer system 20 for one embodiment. The software of the computer system 20 includes an audio application program 200, a video application program 202, and an electronic mail application program 204. The software of the computer system 20 further comprises an operating system 206 and a communication driver program 208.

The communication driver program 208 enables the audio application 200, the video application program 202, and the electronic mail application program 204 to transfer digital data over the communication link 30 according to an asynchronous transfer mode communication protocol. The communication driver program 208 receives outbound data from the audio application program 200, the video application program 202, and the electronic mail application program 204 and assembles the data into outbound data buffers into the main memory 24.

The communication driver program 208 writes the appropriate outbound data pointer parameters into the virtual register blocks 64 and transfers messages into the message queue 68 communication subsystem 26 to indicate available outbound data in the main memory 24. The communication driver program 208 also transfers messages into the message queue 68 of communication subsystem 26 to update the static scheduling table 60, the dynamic scheduling lists 66, and the virtual circuit table, and to set the dynamic timers of the dynamic list timers 52 as the audio application program 200, the video application program 202, and the electronic mail application program 204 open and close virtual circuits on the communication link 30.

The operating system 206 enables the audio application program 200, the video application program 202, and the electronic mail application program 204 to access input/output devices coupled to the system bus 28.

The audio application program 200 performs audio input/output functions for the computer system 20 through the audio subsystem 32. The operating system 206 includes an audio driver program that enables communication between the audio application program 200 and the audio subsystem 32. For one embodiment, the audio application program 200 generates constant bit rate audio data for transfer over the communication link 30 through a virtual circuit. The audio application program 200 invokes the communication driver program 208 to create the virtual circuit and to post the audio data into the appropriate outbound data buffers in the main memory 24.

The video application program 202 enables video input and output functions through the video subsystem 34. The operating system 206 includes a video device driver that enables the video application program 202 to communicate with the video subsystem 34. For one embodiment, the video application program 202 generates constant bit rate video data for transfer over the communication link 30 through a virtual circuit by invoking the communication driver program 208 to create the virtual circuit and post the video data into the appropriate outbound data buffers in the main memory 24.

The electronic mail application program 204 enables electronic mail services to the computer system 20. The electronic mail application program 204 assembles a directory of electronic mail using the operating system 206. The electronic mail application program 204 generates variable bit rate digital information for transfer over a virtual circuit of the communication link 30. If outbound electronic mail from the electronic mail application program 204 is targeted for communication devices coupled to the communication link 30 then the electronic mail application program 204 invokes the communication driver program 208 to post the electronic mail data into the appropriate outbound data buffers in the main memory 24.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A communication subsystem, comprising:

static scheduler that accesses a scheduling list that specifies either a virtual circuit or a dynamic scheduling indication for a cell slot on a communication link, the static scheduler selecting the virtual circuit specified by the scheduling list for transfer of an outbound communication cell if the scheduling list specifies the virtual circuit for the cell slot;

dynamic scheduler that selects a virtual circuit from a dynamic scheduling list for transfer of the outbound communication cell if the scheduling list specifies the dynamic scheduling indication for the cell slot.

2. The communication subsystem of claim 1, wherein the static scheduler selects the virtual circuit specified by the scheduling list if the scheduling list specifies the virtual circuit for the cell slot and if a hint indication corresponding to the virtual circuit specified by the scheduling list indicates that outbound data is available.

3. The communication subsystem of claim 1, wherein the dynamic scheduler selects the virtual circuit specified by the dynamic scheduling list if the scheduling list specifies the virtual circuit and if a hint indication corresponding to the virtual circuit indicates that outbound data is not available and if a timer corresponding to the virtual circuit specified by the dynamic scheduling list indicates that the dynamic scheduling list is enabled.

4. The communication subsystem of claim 1, wherein the dynamic scheduler selects the virtual circuit specified by the dynamic scheduling list if the scheduling list specifies the dynamic scheduling indication for the cell slot and if a timer corresponding to the virtual circuit specified by the dynamic scheduling list indicates that the dynamic scheduling list is enabled.

5. The communication subsystem of claim 4, further comprising a timer preprogrammed with a timer count, wherein the timer counts down when the cell slot occurs and enables the dynamic scheduling list when the timer count expires.

6. The communication subsystem of claim 1, further comprising an outbound communication cell first in first out (FIFO) buffer that buffers the outbound communication cell for transfer over the communication link.

7. The communication subsystem of claim 6, further comprising a counter that counts if an idle communication cell is transferred over the communication link due to an underrun in the FIFO buffer.

8. The communication subsystem of claim 7, wherein the virtual circuit specified by the dynamic scheduling list is skipped if the counter indicates the underrun.

9. A method for scheduling communication cells in a communication network, comprising the steps of:

accessing a scheduling list that specifies either a virtual circuit or a dynamic scheduling indication for a cell slot on a communication link in the communication network;

selecting the virtual circuit specified by the scheduling list for transfer of an outbound communication cell if the scheduling list specifies the virtual circuit for the cell slot;

selecting a virtual circuit from a dynamic scheduling list for transfer of the outbound communication cell if the scheduling list specifies the dynamic scheduling indication for the cell slot.

10. The method of claim 9, wherein the virtual circuit specified by the scheduling list is selected if the scheduling list specifies the virtual circuit for the cell slot and if a hint indication corresponding to the virtual circuit specified by the scheduling list indicates that outbound data is available.

11. The method of claim 9, wherein the virtual circuit specified by the dynamic scheduling list is selected if the scheduling list specifies the virtual circuit and if a hint indication corresponding to the virtual circuit indicates that outbound data is not available and if a timer corresponding to the virtual circuit specified by the dynamic scheduling list indicates that the dynamic scheduling list is enabled.

12. The method of claim 9, wherein the virtual circuit specified by the dynamic scheduling list is selected if the scheduling list specifies the dynamic scheduling indication for the cell slot and if a timer corresponding to the virtual circuit specified by the dynamic scheduling list indicates that the dynamic scheduling list is enabled.

13. The method of claim 12, further comprising the steps of counting down a timer count when the cell slot occurs and enabling the dynamic scheduling list when the timer count expires.

14. The method of claim 9, further comprising the step of buffering the outbound communication cell in a first in first out (FIFO) buffer for transfer over the communication link.

15. The method of claim 14, further comprising the steps of generating an idle communication cell and counting the idle communication cell if the idle communication cell is transferred over the communication link due to an underrun in the FIFO buffer.

16. The method of claim 15, wherein the virtual circuit specified by the dynamic scheduling list is skipped if the count of the idle communication cell indicates the underrun.

17. A computer system, comprising:

processor that maintains a set of communication data buffers for buffering a set of outbound communication cells for transfer over a communication link, and that maintains a scheduling list for scheduling a series of cell slots on the communication link;

communication subsystem coupled for communication over the communication link, the communication subsystem having a static scheduler that accesses the scheduling list that specifies either a virtual circuit or a dynamic scheduling indication for each cell slot on the communication link, the static scheduler selecting the virtual circuit specified by the scheduling list for transfer of one of the outbound communication cells if the scheduling list specifies the virtual circuit for the cell slot, the communication subsystem having a dynamic scheduler that selects a virtual circuit from a dynamic scheduling list for transfer of one of the outbound communication cells if the scheduling list specifies the dynamic scheduling indication for the cell slot.

18. The computer system of claim 17, wherein the static scheduler selects the virtual circuit specified by the scheduling list if the scheduling list specifies the virtual circuit for the cell slot and if a hint indication corresponding to the virtual circuit specified by the scheduling list indicates that outbound data is available in the communication data buffers.

19. The computer system of claim 17, wherein the dynamic scheduler selects the virtual circuit specified by the dynamic scheduling list if the scheduling list specifies the virtual circuit and if a hint indication corresponding to the virtual circuit indicates that outbound data is not available in the communication data buffers and if a timer corresponding to the virtual circuit specified by the dynamic scheduling list indicates that the dynamic scheduling list is enabled.

20. The computer system of claim 17, wherein the dynamic scheduler selects the virtual circuit specified by the dynamic scheduling list if the scheduling list specifies the dynamic scheduling indication for the cell slot and if a timer corresponding to the virtual circuit specified by the dynamic scheduling list indicates that the dynamic scheduling list is enabled.

21. The computer system of claim 20, wherein the communication subsystem further comprises a timer preprogrammed with a timer count, wherein the timer counts down when the cell slot occurs and enables the dynamic scheduling list when the timer count expires.

22. The computer system of claim 17, wherein the communication subsystem further comprises an outbound communication cell first in first out (FIFO) buffer that buffers the outbound communication cell for transfer over the communication link.

23. The computer system of claim 22, wherein the communication subsystem further comprises a counter that counts if an idle communication cell is transferred over the communication link due to an underrun in the FIFO buffer.

24. The computer system of claim 23, wherein the virtual circuit specified by the dynamic scheduling list is skipped if the counter indicates the underrun.

* * * * *